US007545619B2

(12) United States Patent
Durth et al.

(10) Patent No.: US 7,545,619 B2
(45) Date of Patent: Jun. 9, 2009

(54) OVERLOAD PROTECTION DEVICE

(75) Inventors: Rainer Durth, Horn-Bad Meinberg (DE); Martin Wetter, Detmold (DE); Joachim Wosgien, Loehne (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 11/952,625

(22) Filed: Dec. 7, 2007

(65) Prior Publication Data

US 2008/0084646 A1 Apr. 10, 2008

Related U.S. Application Data

(63) Continuation of application No. 10/488,432, filed as application No. PCT/EP02/09569 on Aug. 28, 2002, now Pat. No. 7,324,319.

(30) Foreign Application Priority Data

Sep. 2, 2001 (DE) ................................ 101 42 575
Sep. 23, 2001 (DE) ................................ 101 46 728

(51) Int. Cl.
*H02H 1/00* (2006.01)

(52) U.S. Cl. ....................................... 361/120; 361/117

(58) Field of Classification Search ......... 361/117–120, 361/172, 128
See application file for complete search history.

(56) References Cited

U.S. PATENT DOCUMENTS

| | | | | |
|---|---|---|---|---|
| 1,406,858 | A * | 2/1922 | Henricks | 123/627 |
| 3,816,798 | A * | 6/1974 | Lafferty | 315/330 |
| 4,625,254 | A * | 11/1986 | Fahlen | 361/16 |
| 5,325,259 | A * | 6/1994 | Paulsson | 361/128 |
| 5,436,608 | A | 7/1995 | Togura | 338/21 |
| 5,465,030 | A * | 11/1995 | Smith | 315/349 |
| 5,506,071 | A | 4/1996 | Tanaka et al. | 429/181 |
| 5,641,935 | A * | 6/1997 | Hunter et al. | 102/206 |
| 5,854,732 | A * | 12/1998 | Murray | 361/120 |
| 5,963,413 | A | 10/1999 | Zahlmann et al. | 361/118 |
| 6,111,740 | A | 8/2000 | Danowsky et al. | 361/120 |
| 6,788,519 | B2 * | 9/2004 | Zahlmann et al. | 361/129 |
| 7,324,319 | B2 * | 1/2008 | Durth et al. | 361/120 |

FOREIGN PATENT DOCUMENTS

| | | |
|---|---|---|
| DE | 3642818 | 6/1988 |
| DE | 3905799 | 9/1990 |
| DE | 3915198 | 11/1990 |
| DE | 4141681 | 7/1993 |
| DE | 4244051 | 7/1994 |
| DE | 4402615 | 12/1994 |
| DE | 4390682 | 7/1996 |
| DE | 19510181 | 6/1998 |
| DE | 19717802 | 11/1998 |
| DE | 19742302 | 4/1999 |

(Continued)

*Primary Examiner*—Stephen W Jackson
*Assistant Examiner*—Danny Nguyen
(74) *Attorney, Agent, or Firm*—Darby & Darby

(57) ABSTRACT

A surge protection device includes a first electrode and a second electrode. An air breakdown spark gap is between the second and first electrodes, an arc being formed upon an ignition of the air breakdown spark gap. A series arrangement of a potential dividing element and an ignition element is connected to the first and second electrodes.

12 Claims, 2 Drawing Sheets

FOREIGN PATENT DOCUMENTS

| | | | |
|---|---|---|---|
| DE | 19803636 | | 8/1999 |
| DE | 19856939 | | 6/2000 |
| DE | 10060426 | | 6/2002 |
| FR | 1105378 | | 11/1955 |
| GB | 2345390 | | 7/2000 |
| JP | 9266052 | | 10/1997 |
| WO | WO 0163710 | A1 * | 1/2001 |

* cited by examiner

OVERLOAD PROTECTION DEVICE

CROSS REFERENCE TO RELATED APPLICATIONS

This is a continuation of application Ser. No. 10/488,432, filed Mar. 2, 2004, which is a U.S. national phase application of international application no. PCT/EP02/09569, filed 28 Aug. 2002, which claims priority to German application no. 101 42 575.9, filed 2 Sep. 2001, and to German application no. 101 46 728.1, filed 23 Sep. 2001, all of which applications are hereby incorporated by reference herein.

FIELD

The invention relates to a surge protection arrangement, with a first electrode, with a second electrode, and with an existing or active air breakdown spark gap between the two electrodes, whereby upon ignition of the air breakdown spark gap between the two electrodes, an arc arises.

BACKGROUND

Electrical, in particular, however, electronic measuring, control, regulating, and switch circuits, and also for telecommunication arrangements and assemblies are susceptible to transient over-voltages, commonly called power surges, such as those than can occur through atmospheric charges, or also through switch activity or short circuits in energy supply networks. This susceptibility has been used increasingly in electronic components, in particular, transistors and thyristors; above all, integrated circuitries are increasingly endangered in great numbers by transient power surges.

Electrical circuits work with the specified voltage, the rated voltage, normally failure-free. This is not the case when power surges occur. Power surges are all voltages, which lie above the upper tolerance limit of the rated voltage. In this regard, also the transient power surges are counted, which based on atmospheric charges, however, also by switch activity or short circuits, can occur in energy supply networks and can be coupled galvanically, inductively, or capacitively in electric circuitry. In order to protect electrical or electronic circuitry against power surges, in particular, electronic measuring, control, regulating, and switching circuits, as well as telecommunication units and assemblies, where also they are used, power surge protection elements have been developed and have been known for more than 20 years.

Certain surge protection arrangements include at least one spark gap, which with a determined surge activates the operating voltage and therewith prevents power surges from occurring in the circuitry protected by a power surge protection element that are greater than the operating voltage of the spark gap.

With air breakdown spark gaps, generally a breakdown spark gap is meant; included, then, also is a breakdown spark gap, with which not air, but a different gas, is provided between the electrodes. In addition to power surge protection elements with an air flashover spark gap, power surge protection elements with an air flashover spark gap are provided, with which upon activation, a creepage charge occurs.

Power surge protection elements with an air breakdown spark gap, in contrast with power surge protection elements with an air flashover spark gap, have the advantage of a higher surge current carrying capacity, however, the disadvantage of a higher—and also not rather constant—operating voltage. Thus, already different power surge protection elements are proposed with an air breakdown spark gap, which with reference to the operating voltage, have been improved. In this manner, in the area of the electrodes or the active air breakdown spark gap between the electrodes, were realized in various manners with the sparking or ignition aids, for example, such between the electrodes, at least one creepage charge releasing ignition aid was provided, which at least partially projects into the air breakdown spark gap, is designed as graduated, and is made of plastic (compare, for example, the German disclosure documents 41 41 681 or 44 02 615).

The previously mentioned ignition or sparking aids with the previous power surge protection elements can be designated as "passive sparking aids", "passive sparking aids" because they themselves do not activate "actively", rather only by means of a power surge, which acts on the main electrode.

In German published patent document 198 03 636, likewise a power surge protection element with two electrodes is described, with an active air breakdown spark gap between the two electrodes and an ignition or sparking aid. With this power surge protection element, the sparking aid, in contrast to the previously mentioned types, forms a creepage charge releasing sparking aid as an "active sparking aid", namely in that in addition to the two electrodes—here designated as main electrodes—two more sparking electrodes are provided. These two sparking electrodes form a second air breakdown spark gap, serving as an ignition spark gap. With this power surge protection element, an ignition circuit belongs to the ignition aid outside of the ignitions spark gap with an ignition switch element. Upon contact of a power surge to the power surge protection element, the ignition circuit with the ignition switch element provides for an activation of the ignition spark gap. The ignition spark gap or the two ignition electrodes are arranged with reference to the two main electrodes such that, thereby, it has activated the ignition spark gap, the air breakdown spark gap between the two main electrodes, called the main spark gap, activates. The activation of the ignition spark gap leads to an ionization of the air provided in the air breakdown spark gap, so that, abruptly, after activation of the ignition spark gap, then also the air breakdown spark gap between the two main electrodes, that is, the main spark gap, activates.

With the previously described embodiments of power surge protection elements with ignition aids, the ignition aids lead to an improved, specifically lower and more constant operating voltage.

With surge protection arrangements of the type discussed—with or without an ignition air—upon ignition of the air breakdown spark gap a low-impeded connection arises between the two electrodes. Via this low-impeded connection, first the lightning current to be dissipated flows. With an adjacent network voltage, however, an undesired network sequence current follows via this low-impeded connection of the surge protection arrangement, so that one is anxious to extinguish the arc as quickly as possible after the completed arresting process. One possibility for achieving this goal is to enlarge the arc length and therewith, the arc voltage.

One possibility for extinguishing or canceling the arc after the arresting process, namely, to enlarge the arc length and therewith the arc voltage, is realized with the surge protection arrangement, as is described in German published patent document 44 02 615. The surge protection arrangement described in this document has two narrow electrodes, which, respectively, are angularly formed and which each have a spark horn and a connection leg angled therefrom. In addition, the spark horns for the electrodes are provided with a bore in the regions bordering the connection leg. The bores provided in the spark horns of the electrodes sees to it that in the moment of the activation of the surge protection element, that is of the ignition, the arisen arc is "put into motion", that is, diffused away from its formation position. Since the spark horns of the electrodes are arranged V-shaped relative to one another, the gap to be bridged over from the arc, upon diffusing out of the arc, enlarges, whereby also the arc voltage increases.

A further possibility for extinguishing the act after the arresting process exists in the cooling of the arc by means of the cooling action of insulation walls, as well as the use of gas-emitting insulation. In this manner, an intense flow of the extinguishing gas is necessary, which requires a high constructive expense.

If the arc is extinguished in surge protection arrangements of the type discussed, then first, the low-impeded connection between the two electrodes is interrupted, the space between the two electrodes, that is, the region of the air breakdown spark gap, is almost completely filled with plasma, however. By means of the existing plasma, however, the operating voltage between the two electrodes is lowered, such that it can result in a renewed ignition of the air breakdown spark gap already with an adjacent operating voltage. This problem occurs particularly, then, when the surge protection arrangement has an encapsulated or half-open housing, since then, a cooling or escape of the plasma is prevented by the essentially closed housing.

In order to prevent a renewed ignition of the surge protection arrangement, that is, the air breakdown spark gap, different features have been proposed up to now, in order to drive away or cool the ionized gas clouds from the ignition electrodes. In this connection, constructively expensive labyrinths and cooling bodies are used, whereby the manufacture of the surge protection arrangement is made more expensive.

In German published patent document 100 40 632, a surge protection arrangement is described, in which a renewed activation of the air breakdown spark gap is prevented after the arresting process, which can be realized constructively simply. With this surge protection arrangement, it operates with a main spark gap, with an ancillary spark gap, and with a housing accommodating the main spark gap and the ancillary spark gap, whereby the main spark gap has a first main electrode, a second main electrode, and an existing or active air breakdown spark gap between the main electrodes, and upon ignition of the air breakdown spark gap, an arc arises between the first main electrode and the second main electrode. The ancillary spark gap has a first ancillary electrode, a second ancillary electrode and a second air breakdown spark gap between the ancillary electrodes. An ignition of the two air breakdown spark gaps lead to an ignition of the first air breakdown spark gap, whereby the second ancillary electrode, via at least one impedance, is directly or indirectly connected with the second main electrode.

U.S. Pat. No. 5,436,608 describes a surge protection element, in which the operating voltage, or ignition voltage, is preset by the geometric dimension of the silicon chip. The ignition voltage is determined by the height of a projection on the silicon chip, the projection being located in an insulated manner between an electrode and the silicon chip. This arrangement has the disadvantage that the operating voltage is accomplished through accurate configuration of the height of the projection. This requires high accuracy of manufacture; subsequent change of the operating voltage is not possible. Moreover, the insulating film required for this device can be damaged or destroyed when a power surge is discharged, as a result of which the surge protection element would be changed in its operating voltage to such an extent that it would no longer be functional.

Document JP 09266052 from Patent Abstracts of Japan describes a surge protection element, which is composed of two opposite electrodes having a special shape, and in which a capacitive impedance, in particular a capacitor and a resistor, is connected between the electrodes. However, this arrangement is only able to discharge smaller surges, which do not yet produce any spark between the opposite electrodes. To ignite the spark gap between the opposite electrodes, the ignition voltage of the spark gap must be reached or exceeded.

German patent document DE 19510181 C1 describes a surge protection element, in which a first spark gap is used to trigger the flashover at the second, that is, the main spark gap. In this context, the operating voltage of the first spark gap is set by the electrode spacing of the first spark gap and an impedance connected in series thereto. In this arrangement too, an accurate dimensioning of the electrode spacing of the first spark gap is necessary for the adjustment of the ignition voltage.

French patent document FR 1105378 A describes a surge protection element including a main spark gap and a parallel ancillary spark gap with a capacitance. A capacitance is connected to the ancillary spark gap, the geometric arrangement being designed in such a manner that an ignited ancillary spark gap will not ignite the main spark gap. Here, the ancillary spark gap is intended to discharge smaller surges; the main spark gap igniting automatically without ignition aid and only when a larger surge occurs.

SUMMARY

It is an object of the present invention to provide a simple surge protection arrangement in a with a simply acting ignition aid.

The present invention provides a surge protection device including a first electrode, a second electrode, and a series arrangement of a potential dividing element and an ignition element, the series arrangement being connected to the first and second electrode. The second and first electrodes form an air breakdown spark gap therebetween, the air breakdown spark gap being configured so that an arc occurs upon an ignition of the air breakdown spark gap. The ignition element and the second electrode have a contact region so as to provide a permanent transition resistance.

In this manner, a completely new surge protection device with an ignition air or a completely new ignition aid in a surge protection arrangement is realized, as is provided in the following description.

BRIEF DESCRIPTION OF THE DRAWINGS

In detail, a multitude of possibilities exist for constructing and further embodying the inventive surge protection arrangement. In this connection, reference is made to the claims that depend on claim 1, as well as the following description of embodiments with reference to the drawings. In the drawings:

DETAILED DESCRIPTION

Figure 1:
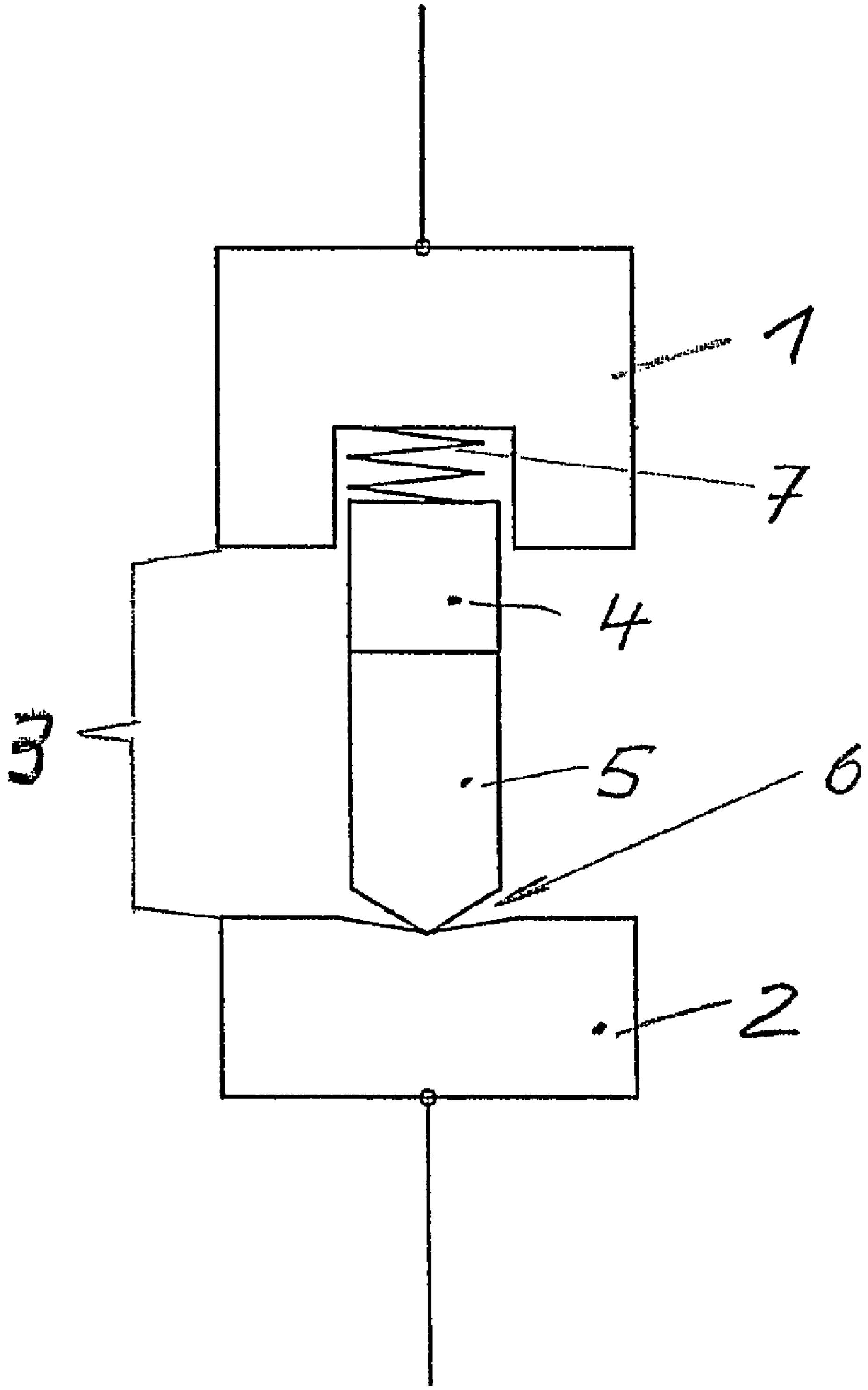
FIG. 1 shows a schematic representation of a first embodiment of the surge protection device of the present invention.

The potential dividing element is chosen or dimensioned such that with the operating voltage, the surge protection arrangement is "switched". As a potential dividing element, a varistor, a suppressor-diode, or a gas-filled voltage arrestor can be provided. Also the possibility exists, however, that as the potential dividing element, a combination of a varistor and a suppressor diode, a combination of a varistor and a gas-filled excess voltage suppressor, a combination of a suppressor diode and a gas-filled excess voltage suppressor or a combination of a varistor, a suppressor diode and a gas-filled excess voltage suppressor is provided. The ignition element is made of an electrically conductive material and is arc-resistant; in addition, the ignition element cannot be welded or smelted with the electrode associated with it, that is, with the electrode with which it is in electrically conductive contact. Preferably, the ignition element and/or the electrode associated with the ignition element are made from an electrically conductive ceramic material, from a non-welded metallic material, and/or from an electrically conductive plastic.

If a surge acts on the inventive sure protection arrangement, which is the same or greater than the operating voltage provided by the potential dividing element, then the potential dividing element activates, so that a leakage current begins to flow over the series connection first electrode—potential dividing element—ignition element—second electrode; surges with minimal energy content, then, are bled off via the previously described series connection. If the energy content is greater than the surge on the surge protection arrangement, a correspondingly greater current flows. This current leads to discharge at the contact point between the ignition element and the associated element because of the high transition resistance on the contact point, which leads to a pre-ionization of the contact region, so that an arc is formed which bridges the contact point. Because of the not insubstantial resistance of the ignition element, the arc migrates to the ignition element, on order to bridge its resistance. This mechanism then leads to an ignition of the air breakdown spark gap between the two electrodes, that is, between the two electrodes, an arc arises.

According to the present invention, then, a surge protection arrangement with an ignition aid is provided, with which the operating voltage can be adjusted in a simple manner in wide limits with minimal tolerances, namely, by the selection or dimensioning of the potential dividing element. In this connection, the ignition aid with the inventive surge protection arrangement should not be susceptible to mechanical and thermal exposure and should be placeable directly inside of the spark gap formed by the two electrodes. It is also important that with the inventive surge protection arrangement, a "passive ignition aid" was realized, that is, an additional ignition circuit—with an ignition pulse generator—is not required.

Figure 2:
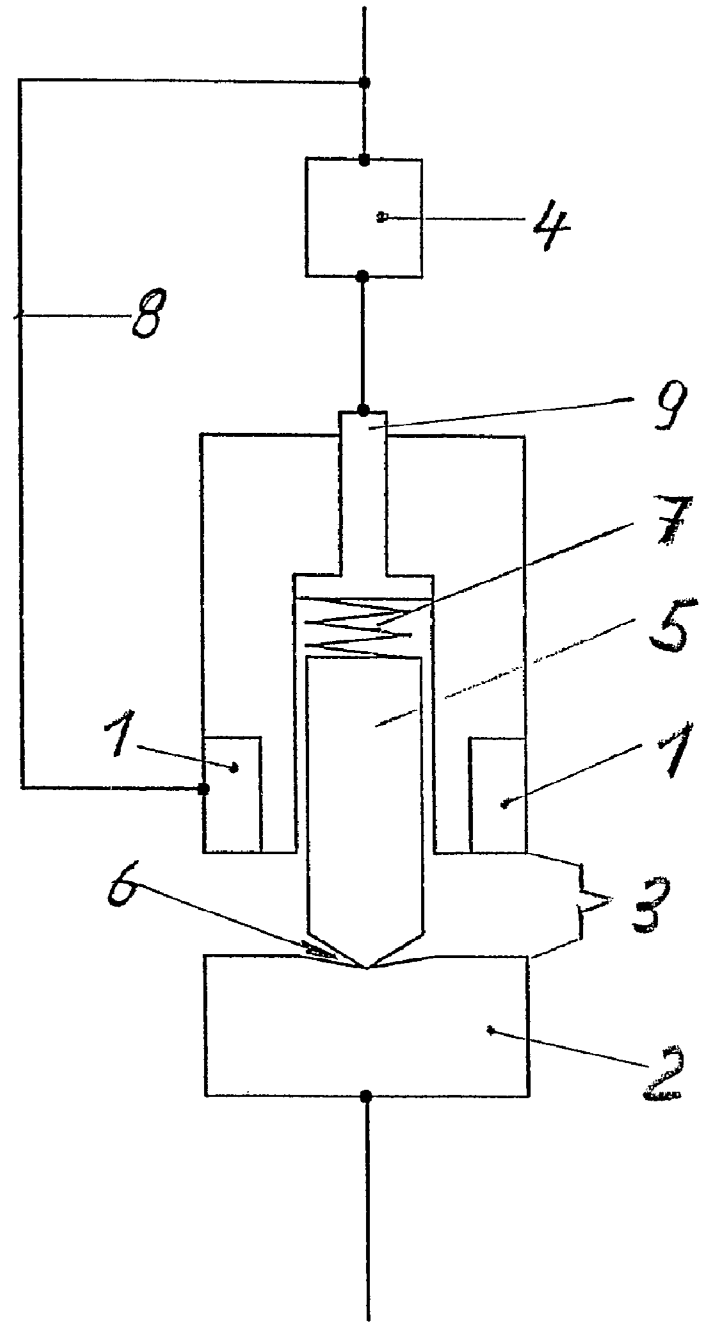
FIG. 2 shows a schematic representation of a second embodiment of the surge protection device of the present invention.

In FIGS. 1 and 2, respectively, a surge protection arrangement of the present invention is shown only with reference to their principal structure. Each shown surge protection arrangement includes a first electrode 1, a second electrode 2, and an existing or active air breakdown spark gap 3 between the two electrodes. For the inventive surge protection arrangements, as with the surge protection arrangements on which the invention is based, upon ignition of the air breakdown spark gap 3 between the two electrodes 1 and 2, an arc—not shown—arises.

According to the present invention, the series connection of a potential dividing element 4 and an ignition element 5 is connected to the two electrodes 1 and 2.

In FIGS. 1 and 2, the potential dividing element 4 is only schematically shown. As a potential dividing element 4, with which the operating voltage of the inventive surge protection arrangement is provided, a varistor, a suppressor diode, or a gas-filled voltage suppressor can be provided. However, also the possibility exists that as a potential dividing element 4, a combination of a varistor and a suppressor diode, a combination of a varistor and a gas-filled excess voltage suppressor, a combination of a suppressor diode and a gas-filled excess voltage suppressor or a combination of a varistor, a suppressor diode and a gas-filled excess voltage suppressor can be provided.

Like the potential dividing element 4, also the ignition element 5 of surge protection arrangement shown in FIGS. 1 and 2 only schematically shown. The ignition element 5 is made from a material, which is electrically conductive and arc-resistant. In addition, the ignition element 5 cannot be welded to the contact point 6 of the electrode 2 with the electrode 2. Preferably, the ignition element 5 and/or the electrode 2 associated with the ignition element 5 is made from an electrically conductive ceramic material, from a non-welded metallic material and/or form an electrically conductive plastic.

In detail, a transition resistance is provided permanently between the ignition element 5 and the electrode 2 associated with the ignition element 5; the contact point 6, then, has a permanent transition resistance. This transition resistance can be realized through an appropriate selection of the electrical conductivity of the materials of the ignition element 5 and/or the electrode 2 associated with the ignition element 5, preferably by an appropriate selection of the material of the ignition element 5. The transition resistance provided permanently on the contact point 6 can be realized by an appropriate selection of the electrical conductivity of the materials of the ignition element 5 and/or the electrode 2 associated with the ignition element 5, or additionally, by an appropriate geometric formation of the ignition element 5 on the contact point 6 to the associated electrode 2 and/or by an appropriate geometric formation of the electrode 2 on the contact point 6 for the ignition element 5, preferably by a small contact surface.

The contact surface 6 between the ignition element 6 and the associated electrode 2, particularly, has a small contact surface then, when the ignition element 5 on its end associated with the electrode 2 is punciform or cutting-formed and the electrode 2 is convexly formed on its side facing the ignition element 5. With the geometric realization of the contact point 6 between the ignition element 5 and the electrode 2, however, it should also be noted that the air gap following the contact point 6 that is between the ignition element 5 and the electrode 2, two criteria, with regard to electrical considerations, are met. First, the air gap is large enough so that with a surge with minimal energy content, the leakage current flows only over the contact point 6, that is, the contact region encompassing the contact point 6, experiences no pre-ionization. Second, the air gap is small enough so that, when the energy content of the surge is greater, the flowing current leads to a pre-ionization of the contact region encompassing the contact point 6. A solution, which meets the two criteria, is realized with the shown embodiments. In this manner, the end of the ignition element 5 facing the electrode 2 is cone-shaped convexly and the side of the electrode 2 facing the ignition element 5 is cone-shaped concavely.

FIGS. 1 and 2 show that with the preferred embodiments of the present invention, the contact pressure between the ignition element 5 and the associated electrode 2 is adjustable. In the embodiments, this is realized by means of a pressure spring 7 acting on the ignition element 5, with pressure springs 7, different types of spring being useable for different contact pressures. However, also the non-illustrated possibility exists to make the contact pressure between the ignition element 5 and the associated electrode 2 adjustable by means of a mechanically reversible deformable material of the ignition element 5 and/or at least one electrode, preferably, the electrode 2 associated with the ignition element 5.

As noted above, with the inventive surge protection device, a series connection of a potential dividing element 4 and an ignition element 5 is provided between the two electrodes 1 and 2. What is meant is an electrical series connection, not implicitly mechanical or spatial or geometric.

In the embodiment of the inventive surge protection arrangement shown schematically in FIG. 1, the potential dividing element 4 as well as the ignition element 5 is provided spatially between the two electrodes 1 and 2. In addition, FIG. 2 shows an embodiment, in which the potential dividing element 4 is arranged spatially outside of the region between the two electrodes 1 and 2. With this embodiment, the potential dividing element 5 arranged outside of the region between the two electrodes 1 and 2, on one side, is connected with the electrode 2 via an outer connecting element 8 and on the other side, is connected via a connection pin 9 with the—electrically conducting—pressure spring 7, and therewith, with the ignition element 5.

What is claimed is:

1. A surge protection device comprising:

a first electrode;

a second electrode, the second and first electrodes forming an air breakdown spark gap therebetween, the air breakdown spark gap being configured so that an arc occurs upon an ignition of the air breakdown spark gap; and a series arrangement of a potential dividing element and an ignition element, the series arrangement being connected to the first and second electrodes;

wherein the ignition element and the second electrode have a contact region so as to provide a permanent transition resistance.

2. The surge protection device as recited in claim 1 wherein the potential dividing element includes at least one of a varistor; a suppressor diode; a gas-filled excess voltage suppressor; a combination of a varistor and a suppressor diode; a combination of a varistor and a gas-filled excess voltage suppressor; a combination of a suppressor diode and a gas-filled excess voltage suppressor; and a combination of a varistor, a suppressor diode and a gas-filled excess voltage suppressor.

3. The surge protection device as recited in claim 1 wherein the second electrode is associated with the ignition element and wherein at least one of the ignition element and the second electrode includes at least one of an electrically conductive ceramic material and an electrically conductive plastic.

4. The surge protection device as recited in claim 1 wherein the permanent transition resistance is a high transition resistance and wherein at least one of the ignition element and the second electrode includes a material having an electrical conductivity selected to achieve the transition resistance.

5. The surge protection device as recited in claim 4 wherein the ignition element includes the material having an electrical conductivity selected to achieve the transition resistance.

6. The surge protection device as recited in claim 1 wherein the contact region includes a small contact surface area.

7. The surge protection device as recited in claim 1 wherein the potential dividing element and the ignition element are disposed between the two electrodes.

8. The surge protection device as recited in claim 1 wherein the potential dividing element is disposed outside of a region between the first and second electrodes.

9. The surge protection device as recited in claim 1 wherein at least one of the ignition element and the second electrode has a shape at the contact region so as to achieve the permanent transition resistance.

10. The surge protection device as recited in claim 1 wherein the ignition element has a convex shape and the second electrode has a concave shape at the contact region so as to achieve the permanent transition resistance.

11. The surge protection device as recited in claim 10 wherein the ignition element has a cone shape, an apex of the cone forming the contact region with the second electrode.

12. The surge protection device as recited in claim 11 wherein the second electrode has a cone shape.

* * * * *